US011787400B2

(12) United States Patent
Dakemoto et al.

(10) Patent No.: US 11,787,400 B2
(45) Date of Patent: Oct. 17, 2023

(54) CONTROL DEVICE, METHOD, NON-TRANSITORY STORAGE MEDIUM, AND VEHICLE

(71) Applicant: TOYOTA JIDOSHA KABUSHIKI KAISHA, Toyota (JP)

(72) Inventors: Masumi Dakemoto, Nagoya (JP); Kaiji Itabashi, Nagoya (JP); Yoshihisa Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 17/193,329

(22) Filed: Mar. 5, 2021

(65) Prior Publication Data

US 2021/0291821 A1 Sep. 23, 2021

(30) Foreign Application Priority Data

Mar. 18, 2020 (JP) ................. 2020-048331

(51) Int. Cl.
*B60W 30/09* (2012.01)
*B60R 16/023* (2006.01)
(52) U.S. Cl.
CPC ......... *B60W 30/09* (2013.01); *B60R 16/0231* (2013.01)
(58) Field of Classification Search
CPC ................. B60W 30/09; B60W 30/12; B60W 2050/0085; B60W 50/00; B60W 30/06; B60W 30/14; B60R 16/0231
See application file for complete search history.

(56) References Cited

U.S. PATENT DOCUMENTS

| 7,096,116 | B2* | 8/2006 | Tanaka | G01C 25/00 342/357.31 |
| 2004/0148093 | A1* | 7/2004 | Tanaka | G01C 25/00 701/400 |
| 2012/0109414 | A1 | 5/2012 | Kumabe et al. | |
| 2017/0029026 | A1* | 2/2017 | Okuda | B62D 15/025 |
| 2019/0300052 | A1 | 10/2019 | Allan et al. | |

(Continued)

FOREIGN PATENT DOCUMENTS

| CN | 102556149 A | 7/2012 |
| DE | 102008036772 A1 | 2/2010 |
| DE | 102009051471 A1 | 5/2011 |

(Continued)

OTHER PUBLICATIONS

Mar. 17, 2023 Office Action issued in U.S. Appl. No. 17/163,637.

(Continued)

*Primary Examiner* — Tarek Elarabi
(74) *Attorney, Agent, or Firm* — Oliff PLC

(57) ABSTRACT

A control device mounted on a vehicle, the control device includes one or more processors configured to: receive a plurality of first requests from a driver assistance system; arbitrate the first requests; calculate a second request based on an arbitration result, wherein the first requests and the second request are different physical quantities from each other; distribute the second request to at least one of a plurality of actuator systems; and output, to the driver assistance system, information regarding a middle point of a steering actuator included in the actuator systems in the driver assistance system.

6 Claims, 2 Drawing Sheets

(56) References Cited

U.S. PATENT DOCUMENTS

2020/0070849 A1    3/2020  Suzuki et al.

FOREIGN PATENT DOCUMENTS

| | | |
|---|---|---|
| DE | 102019107768 A1 | 10/2019 |
| JP | H09-311036 A | 12/1997 |
| JP | 2004-286724 A | 10/2004 |
| JP | 2007-203761 A | 8/2007 |
| JP | 2009-276098 A | 11/2009 |
| JP | 2010-058651 A | 3/2010 |
| JP | 2012-096618 A | 5/2012 |
| JP | 2017-030472 A | 2/2017 |
| JP | 2020-032894 A | 3/2020 |

OTHER PUBLICATIONS

U.S. Appl. No. 17/163,637, filed Feb. 1, 2021, in the name of Yoshihisa Yamada.
Jun. 14, 2023 Notice of Allowance issued in U.S. Appl. No. 17/163,637.

* cited by examiner

CONTROL DEVICE, METHOD, NON-TRANSITORY STORAGE MEDIUM, AND VEHICLE

CROSS-REFERENCE TO RELATED APPLICATION

This application claims priority to Japanese Patent Application No. 2020-048331 filed on Mar. 18, 2020, incorporated herein by reference in its entirety.

BACKGROUND

1. Technical Field

The present disclosure relates to a control device, a method, a non-transitory storage medium, and a vehicle.

2. Description of Related Art

A vehicle may include a plurality of driver assistance devices mounted thereon to output a control instruction for controlling motion of the vehicle in order to assist drive of the vehicle. There is proposed a vehicle control device that arbitrates between control instructions from the driver assistance devices. For example, Japanese Unexamined Patent Application Publication No. 2017-30472 (JP 2017-30472 A) discloses a vehicle control device that arbitrates between a steering instruction from a collision avoidance assist device, which is a driver assistance device that assists a user in driving so as to avoid a collision of a vehicle with an obstacle, and a steering instruction from a lane departure avoidance assist device, which is a driver assistance device that assists a user in driving so as to cause a vehicle to drive in a lane.

SUMMARY

A middle point which represents a control value corresponding to a state in which a vehicle travels straight, for control amounts to be used for processing by the driver assistance devices and related to steering such as a steering angle, may be varied in accordance with torsion, flexure, etc. of various components that constitute a steering device etc.

It is preferable for the driver assistance devices to update the middle point as appropriate in correspondence with such variations and maintain the middle point precisely. The middle point can be updated by detecting the acceleration of the vehicle in the lateral direction using an acceleration sensor etc. and calculating a correction amount based on the detection result, for example. However, some driver assistance devices do not have a function of calculating a correction amount for a middle point, but acquire information for updating the middle point from a different device and update the middle point based on such information.

If some of the driver assistance devices update a middle point while the others do not, an uncomfortable feeling may be felt about the behavior of the vehicle because of the fluctuation in the middle point when the driver assistance control for the vehicle is switched from control by one driver assistance device to control by another.

The present disclosure provides a vehicle control device that can suitably update a middle point for steering stored in a plurality of driver assistance devices to be used for control.

A control device according to a first aspect of the present disclosure and mounted on a vehicle, includes one or more processors configured to: receive a plurality of first requests from a driver assistance system; arbitrate the first requests; calculate a second request based on an arbitration result, wherein the first requests and the second request are different physical quantities from each other; distribute the second request to at least one of a plurality of actuator systems; and output, to the driver assistance system, information regarding a middle point of a steering actuator included in the actuator systems in the driver assistance system.

A method according to a second aspect of the present disclosure to be executed by a computer of a manager mounted on a vehicle, includes: receiving a plurality of kinematic plans from a plurality of ADAS (Advanced Driver Assistance Systems) applications; arbitrating the kinematic plans; calculating a motion request based on an arbitration result; distributing the motion request to at least one of a plurality of actuator systems; and outputting, to the ADAS applications, information regarding a middle point of a steering actuator included in the actuator systems in the ADAS applications.

A non-transitory storage medium according to a third aspect of the present disclosure stores instructions that are executable by one or more computers of a manager mounted on a vehicle and that cause the one or more computers to perform functions comprising: receiving a plurality of kinematic plans from a plurality of ADAS applications; arbitrating the kinematic plans; calculating a motion request based on an arbitration result; distributing the motion request to at least one of a plurality of actuator systems; and outputting, to the ADAS applications, information regarding a middle point of a steering actuator included in the actuator systems in the ADAS applications.

A vehicle according to a fourth aspect of the present disclosure includes the manager according to the first aspect.

According to the present disclosure, the plurality of driver assistance devices can update the middle point together at a determined timing, suppressing the possibility that an uncomfortable feeling is felt about the behavior of the vehicle even if control is switched among the driver assistance devices.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle control device according to the present disclosure updates middle points to be used for control by a plurality of driver assistance devices together at the timing that is considered to have little effect on the behavior of a vehicle.

Embodiment

Configuration

Figure 1:
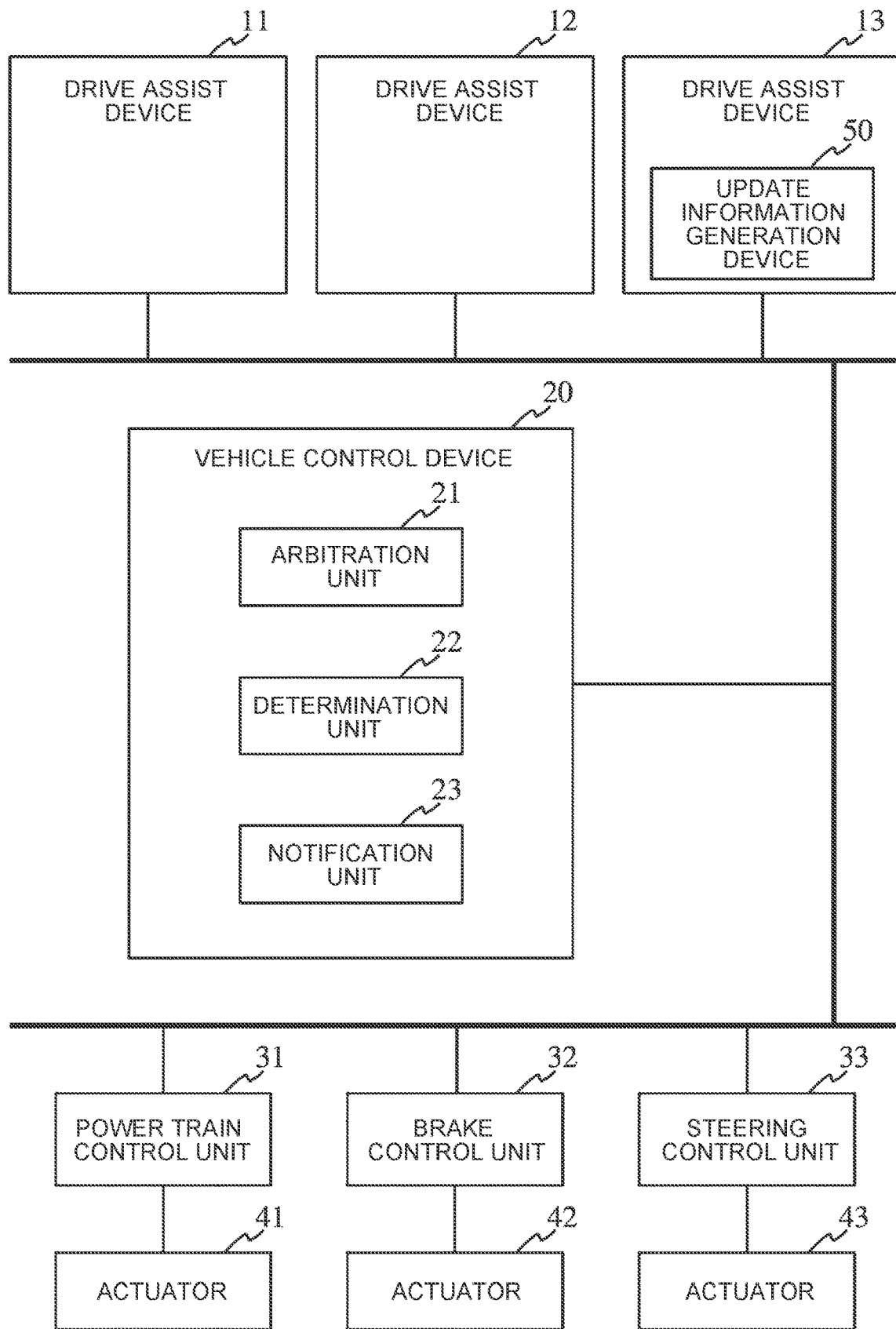
FIG. 1 is a functional block diagram illustrating a vehicle control device according to an embodiment and surrounding portions.

FIG. 1 is a functional block diagram illustrating a vehicle control device 20 according to an embodiment and surrounding portions. The functional blocks illustrated in FIG. 1 include a plurality of driver assistance devices 11 to 13, a vehicle control device 20, a power train control unit 31, a brake control unit 32, a steering control unit 33, and actuators 41 to 43. These devices are typically implemented by a computer such as an electronic control unit (ECU) that has a processor (control unit) such as a control processing unit (CPU) and a memory, and communicably connected via an in-vehicle network such as a Controller Area Network (CAN: registered trademark) or an Ethernet (registered trademark), for example.

Each of the driver assistance devices 11 to 13 executes a driver assistance program to implement a driver assistance function for a vehicle such as automated drive, automatic parking, adaptive cruise control, lane keeping assist, and collision mitigation braking. The driver assistance devices 11 to 13 implement different driver assistance functions, for example, and are operable at the same time. The number of driver assistance devices mounted on the vehicle is not limited to three as illustrated in FIG. 1, and may be two or less or four or more. The driver assistance devices 11 to 13 output a control instruction for requesting operation of the actuators 41 to 43. The driver assistance devices 11 to 13 are examples of driver assistance system or ADAS application.

The driver assistance devices 11 to 13 determine a part or all of the content of control related to the motion of the vehicle, such as "running", "turning", and "stopping" of the vehicle, in accordance with the respective driver assistance functions of the driver assistance devices 11 to 13, and output a control instruction. Examples of the control instruction include required values for motion in the advancing direction of the vehicle for "running" and "stopping", required values for motion in the lateral direction of the vehicle for "turning", etc. For the required values for motion in the advancing direction, specifically, acceleration in the advancing direction is expressed as a target control amount, for example. Meanwhile, for the required values for motion in the lateral direction, specifically, one of lateral acceleration, yaw rate, steering wheel angle, etc. is expressed as a target control amount in accordance with the specifications of the driver assistance program, for example.

The driver assistance devices 11 to 13 acquire information such as the speed of the vehicle, acceleration in the advancing direction, acceleration in the lateral direction, and captured image data on scenes around the vehicle from various sensors (not illustrated) and a different ECU provided in the vehicle, and generate control instructions based on such information. The driver assistance devices 11 to 13 store a control value corresponding to a state in which the vehicle travels straight with no acceleration caused in the lateral direction, that is, information on a middle point that represents the center of steering, for control amounts related to steering in accordance with the need for a process of generating a control instruction. The middle point may be varied in accordance with torsion, flexure, etc. of various components that constitute a steering device etc. It is preferable for the driver assistance devices 11 to 13 to update the middle point as appropriate in correspondence with such variations and maintain the middle point precisely. The middle point can be updated by detecting the acceleration of the vehicle in the lateral direction using an acceleration sensor etc. and calculating a correction amount based on the detection result, for example.

In the present embodiment, the driver assistance device 13 includes an update information generation device 50. The update information generation device 50 generates update information that can be used to update the middle point, such as the correction amount for the middle point discussed above. In addition, the driver assistance devices 11 to 13 acquire update information from the update information generation device 50, and calculate a middle point based on the update information. The update information generation device 50 may not be provided in the driver assistance device 13. For example, the update information generation device 50 may be provided in the vehicle control device 20, may be provided in a different ECU such as the steering control unit 33, or may be provided independently. A driver assistance device that does not store a middle point and that does not utilize a middle point for a process of generating a control instruction may also be provided.

The vehicle control device 20 controls motion of the vehicle by functioning as a motion manager, or a part of a motion manager, that appropriately controls the actuators 41 to 43 etc. related to motion of the vehicle, by determining the content of control related to motion of the vehicle such as "running", "turning", and "stopping" of the vehicle based on the control instructions from the driver assistance devices 11 to 13 and providing necessary instructions to the power train control unit 31, the brake control unit 32, and the steering control unit 33 (and further a shift control unit (not illustrated) that controls a shift position etc.) based on the determined content of control. The vehicle control device 20 may alternatively be a device that exclusively controls motion of the vehicle in the lateral direction. The vehicle control device 20 is implemented by a computer such as an ECU having a processor such as a CPU and memory, and includes an arbitration unit 21, a determination unit 22, and a notification unit 23. The vehicle control device 20 can be regarded as a control device or a manager, and may include a plurality of ECUs, a plurality of processors, and a plurality of memories.

The arbitration unit 21 of the vehicle control device 20 acquires control instructions output from the driver assistance devices 11 to 13, and arbitrates among the acquired control instructions. The control instruction is an example of a first request and a kinematic plan. The kinematic plan may be a vehicle motion or behavior plan including at least one of a longitudinal acceleration/deceleration, a curvature, a steering angle, and a yaw rate.

The arbitration unit 21 selects one control instruction from a plurality of control instructions acquired from the driver assistance devices 11 to 13 based on the predetermined selection criteria, or generates a new control instruction based on the acquired control instructions, for example, as an arbitration process. The new control instruction is an example of a second request that has a physical quantity different from that of the first request. Further, the new control instruction is an example of a motion request. The result of the arbitration may be fed back from the arbitration unit 21 to the driver assistance devices 11 to 13. The arbitration unit 21 may also perform an arbitration process based on information that represents the state of operation or availability which is the present operable performance range of the actuators 41 to 43. The information is notified from the power train control unit 31, the brake control unit 32, and the steering control unit 33 to be discussed later.

The arbitration unit 21 of the vehicle control device 20 can instruct one or two or more of the power train control unit 31, the brake control unit 32, and the steering control unit 33 for control related to motion of the vehicle required by the driver assistance program based on the control instruction which is obtained through the arbitration. Motion of the vehicle in the lateral direction can be typically implemented by controlling steering of the steering device. Motion of the vehicle in the advancing direction can be implemented by controlling generation of a braking force by a brake device and generation of a drive force or a braking force by a power train, either independently or in combination. Each pair of the power train control unit 31 and the actuator 41, the brake control unit 32 and the actuator 42, and the steering control unit 33 and the actuator 43 is an example of an actuator system, The determination unit 22 of the vehicle control device 20 determines whether update of the middle points which are stored in the driver assistance devices 11 to 13 is allowed.

The notification unit 23 of the vehicle control device 20 issues a notification that permits a process of updating the middle points using update information when the determination unit 22 has determined that update of the middle points is allowed.

The power train control unit 31 generates a drive force or a braking force by controlling the actuator 41 which constitutes the power train based on the acquired control instruction.

The brake control unit 32 generates a braking force by controlling the actuator 42 which constitutes the brake device based on the acquired control instruction.

The steering control unit 33 generates a steering angle by controlling the actuator 43 which constitutes the steering device based on the acquired control instruction.

Control

Figure 2:
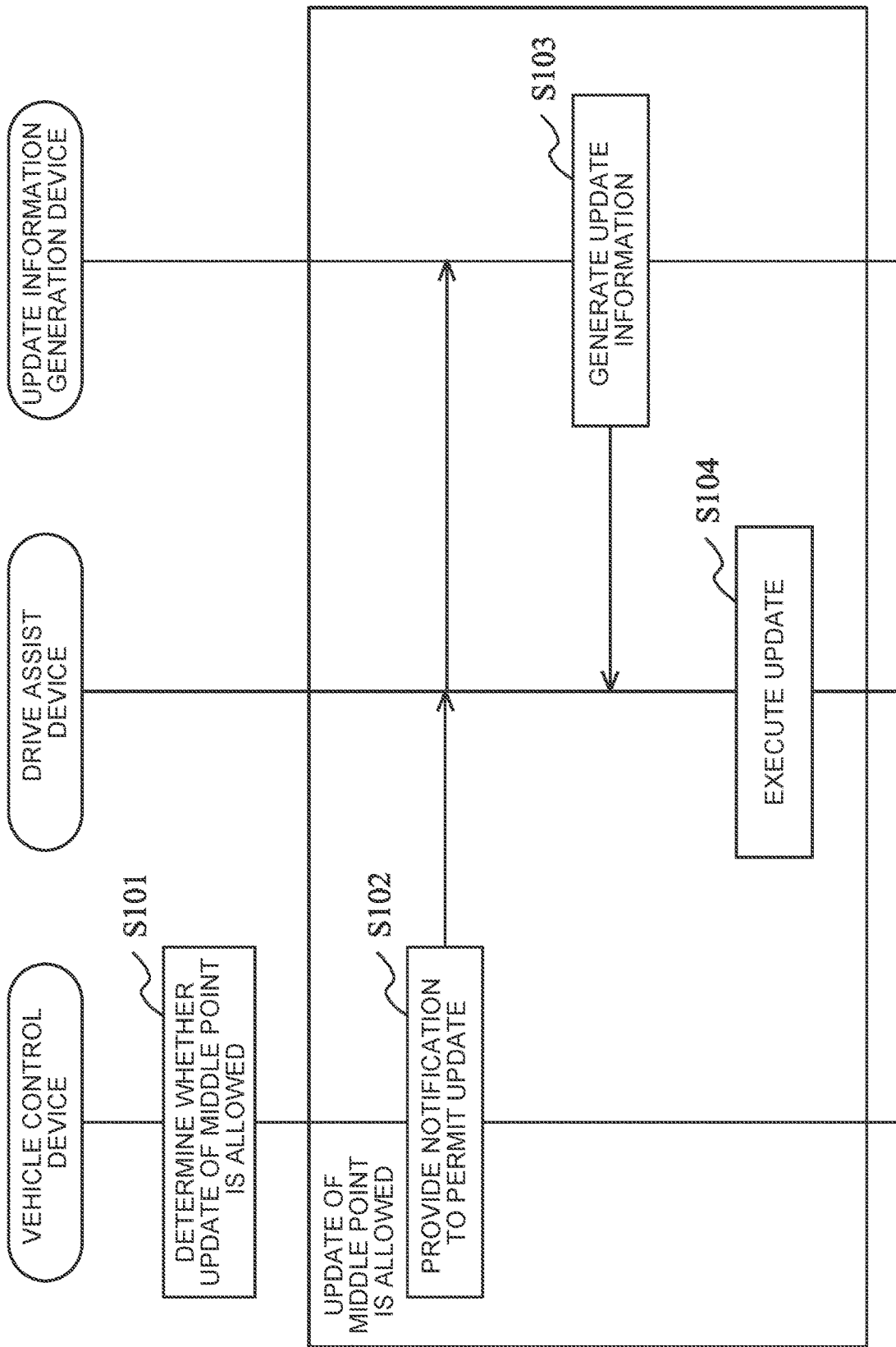
FIG. 2 is a sequence diagram of a process executed by the vehicle control device according to the embodiment.

The process of updating the middle point according to the present embodiment will be described. FIG. 2 is a sequence diagram illustrating an example of the update process. The update process according to the example may be repeatedly executed in a state in which a power source for the vehicle has been turned on (such as power on, ignition on, and ready on), for example. The update process is executed in parallel with the arbitration process discussed above.

Step S101

The determination unit 22 of the vehicle control device 20 determines whether update of the middle point is allowed. Update of the middle point is preferably performed when operation of the vehicle is stable and the behavior of the vehicle is not significantly affected even if the middle point is updated, for example.

For example, the determination unit 22 can determine that the behavior of the vehicle is not affected and update of the middle point is allowed when the state of operation of the driver assistance devices 11 to 13 is acquired and none of the driver assistance devices 11 to 13 is operating.

Alternatively, the determination unit 22 can determine that the behavior of the vehicle is not affected and update of the middle point is allowed when the state of the power source of the vehicle is acquired and a change is made from a power source off state (such as power off, ignition off, and ready off) to a power source on state (such as power on, ignition on, and ready on), that is, in the initial state of start of the vehicle control device 20 and the driver assistance devices 11 to 13.

Alternatively, the determination unit 22 can determine that the behavior of the vehicle is not significantly affected, even if the middle point is updated, and update of the middle point is allowed when the vehicle is traveling generally straight with the steering amount of the vehicle being equal to or less than a first value, that is, with the steering amount being 0 or relatively small, based on a steering angle acquired from a steering angle sensor provided in the vehicle, acceleration in the lateral direction acquired from an acceleration sensor, a control instruction related to steering acquired from the arbitration unit 21, etc. and when control for displacement of the vehicle in the lateral direction is not particularly required, compared to when such control is required.

When it is determined in this step that update of the middle point is allowed, the process proceeds to step S102. If not, the determination in this step is repeatedly made until it is determined that update of the middle point is allowed.

Step S102

The notification unit 23 of the vehicle control device 20 issues a notification to permit a process of updating the middle point.

Step S103

The notification to permit a process of updating the middle point is acquired by the update information generation device 50. The update information generation device 50 generates and issues the update information discussed above in response to the notification.

Step S104

The notification to permit a process of updating the middle point and the update information are acquired by the driver assistance devices 11 to 13. The driver assistance devices execute update of the middle point which is stored in the devices themselves in response to the notification and the update information. There may be two or more update information generation devices. In this case, the two or more update information generation devices differ from each other in the generation method, precision, format, etc. of the update information, for example. Each of the driver assistance devices can acquire the update information generated by the update information generation device that is the most compatible with the driver assistance device and that is determined in advance in accordance with the specifications of the driver assistance device, and use the update information to update the middle point.

When there is a relatively significant delay in communication through the network, there may be a large difference between the time when the update information generation device 50 generates update information and the time when the driver assistance device which has acquired the update information by way of the network updates the middle point, and the actual middle point may be significantly varied during the delay and the precision of the middle point may not be improved even through the update process. Thus, the update information generation device 50 may generate and issue update information a plurality of times, and the driver assistance devices 11 to 13 may execute the update process when the amount of fluctuation in the middle point represented by a plurality of pieces of the update information received successively is equal to or less than a threshold value and the middle point is relatively stable, for example. The update process is ended in the manner described above.

While an example of the configuration and the process has been described above, the configuration and the process are changeable as appropriate if the middle point of the driver assistance devices can be updated at a suitable timing. For example, the functions of the determination unit 22 and the notification unit 23 of the vehicle control device 20 may be implemented by a different ECU from that for the arbitration unit 21. For example, the determination unit 22 and the notification unit 23 may be provided in the update information generation device 50, may be provided in one of the driver assistance devices 11 to 13, for example, or may be provided independently. In addition, the update information generation device 50 may generate and issue update information periodically, rather than when the update information generation device 50 acquires a notification to permit update. In addition, the update information generation device 50 may be provided with the functions of the determination unit 22 and the notification unit 23, and the update information may include a notification to permit update.

Function and Effect

As described above, the vehicle control device according to the present embodiment can update the middle points to be used for control by the plurality of driver assistance devices together, thus suppressing the possibility that an uncomfortable feeling is felt about the behavior of the vehicle even if control is switched among the driver assistance devices. In addition, the vehicle control device can update the middle points at the timing when there is little effect on the behavior of the vehicle, which also makes it possible to suppress the possibility that an uncomfortable feeling is felt about the behavior of the vehicle.

While an embodiment of the technique according to the present disclosure has been described above, the technique according to the present disclosure can be grasped as a vehicle control device, a vehicle control method executed by a computer of the vehicle control device which includes a processor and a memory, a vehicle control program for executing the vehicle control method, a computer-readable non-transitory storage medium that stores the vehicle control program, a system that includes the vehicle control device, driver assistance devices, actuator control units, and actuators, and a vehicle on which the vehicle control device is mounted.

The present disclosure is applicable to a vehicle control device that controls motion of a vehicle.

The disclosure can be also used as the following aspects.

A vehicle control device according to another aspect of the present disclosure is provided in a vehicle. The vehicle includes a plurality of driver assistance devices configured to implement a plurality of driver assistance functions, respectively, and an update information generation device configured to provide update information to be used by at least one of the driver assistance devices to update a middle point in steering control performed by the at least one of the driver assistance devices. The vehicle control device includes one or more processors configured to: determine whether update of the middle point by the at least one of the driver assistance devices is allowed; and issue a notification that permits a process of updating the middle point using the update information when the one or more processors have determined that the update of the middle point is allowed.

In the above aspect, the one or more processors may be configured to determine that the update of the middle point is allowed while an operation of all of the driver assistance devices are being stopped.

In the above aspect, the one or more processors may be configured to determine that the update of the middle point is allowed when a power source of the vehicle which has been turned off is turned on.

In the above aspect, the one or more processors may be configured to determine that the update of the middle point is allowed when detecting that a steering amount of the vehicle is equal to or less than a first value.

In the above aspect, the update information generation device may be provided as part of any of the driver assistance devices, the vehicle control device, or devices configured to control a plurality of actuators provided in the vehicle.

A vehicle control method according to another aspect of the present disclosure is executed by a computer of a vehicle control device provided in a vehicle. The vehicle includes a plurality of driver assistance devices configured to implement a plurality of driver assistance functions, respectively, and an update information generation device configured to provide update information to be used by at least one of the driver assistance devices to update a middle point in steering control performed by the at least one of the driver assistance devices. The vehicle control method includes: determining whether update of the middle point by the at least one of the driver assistance devices is allowed; and issuing a notification that permits a process of updating the middle point using the update information when a determination is made that the update of the middle point is allowed.

A non-transitory storage medium according to another aspect of the present disclosure stores an instruction that is executable by a computer of a vehicle control device provided in a vehicle. The vehicle including a plurality of driver assistance devices configured to implement a plurality of driver assistance functions, respectively, and an update information generation device configured to provide update information to be used by at least one of the driver assistance devices to update a middle point in steering control performed by the at least one of the driver assistance devices. The instruction causing the computer to perform functions includes: determining whether update of the middle point by the at least one of the driver assistance devices is allowed; and issuing a notification that permits a process of updating the middle point using the update information when a determination is made that the update of the middle point is allowed.

A vehicle according to another aspect of the present disclosure includes: a plurality of driver assistance devices configured to implement a plurality of driver assistance functions, respectively; an update information generation device configured to provide update information to be used by at least one of the driver assistance devices to update a middle point in steering control performed by the at least one of the driver assistance devices; and a vehicle control device including one or more processors configured to determine whether update of the middle point by the at least one of the driver assistance devices is allowed, and issue a notification that permits a process of updating the middle point using the update information when the one or processors have determined that the update of the middle point is allowed.

A manager according to another aspect of the present disclosure is mounted on a vehicle. The manager includes one or more processors configured to: receive a plurality of kinematic plans from a plurality of ADAS applications; arbitrate the kinematic plans; calculate a motion request based on an arbitration result; distribute the motion request to at least one of a plurality of actuator systems; and output, to the ADAS applications, information regarding a middle point of a steering actuator included in the actuator systems in the ADAS applications.

A manager according to another aspect of the present disclosure is mounted on a vehicle. The manager includes one or more processors configured to: receive a plurality of first requests from a plurality of ADAS applications; arbitrate the first requests; calculate a second request that has a physical quantity different from those of the first requests, based on an arbitration result; distribute the second request to at least one of a plurality of actuator systems; and output, to the ADAS applications, information regarding a middle point of a steering actuator included in the actuator systems in the ADAS applications.

What is claimed is:

1. A vehicle comprising:
a plurality of drive assist devices configured to implement a plurality of drive assist functions, respectively;

an update information generation device configured to generate update information to be used by at least one of the drive assist devices to update a middle point in steering control performed by the at least one of the drive assist devices; and a control device including a processor programmed to:
   determine whether update of the middle point by the at least one of the drive assist devices is allowed, and
   issue a notification that permits a process of updating the middle point using the update information, to the plurality of the drive assist devices upon determining that the update of the middle point is allowed, wherein:

the control device is programmed to determine that the update of the middle point is allowed while respective operations of all the drive assist devices are stopped;

a certain drive assist device among the plurality of the drive assist devices includes the update information generation device, and when the certain drive assist device receives the notification that permits the process of updating the middle point, the update information generation device in the certain drive assist device generates the update information; and other drive assist devices than the certain drive assist device among the plurality of the drive assist devices do not generate the update information and instead receive the update information from the certain drive assist device, the update information being generated by the update information generation device included in the certain drive assist device.

2. The vehicle according to claim 1, wherein the control device is programmed to determine that the update of the middle point is allowed when a power source of the vehicle which has been turned off is turned on.

3. The vehicle according to claim 1, wherein the control device is programmed to determine that the update of the middle point is allowed when a detected steering amount of the vehicle is equal to or less than a first value.

4. The vehicle according to claim 1, further comprising a plurality of update information generation devices, wherein the update information generation devices are provided in any one or more of the following: (i) any one or more of the plurality of the drive assist devices, (ii) the control device of the vehicle, and (iii) devices configured to control a plurality of actuators provided in the vehicle.

5. A method to be executed by a computer mounted on a vehicle, the vehicle including a plurality of drive assist devices configured to implement a plurality of drive assist functions, respectively, and an update information generation device configured to generate update information to be used by at least one of the drive assist devices to update a middle point in steering control performed by the at least one of the drive assist devices, the method comprising:
   determining whether update of the middle point by the at least one of the drive assist devices is allowed; and
   issuing a notification that permits a process of updating the middle point using the update information, to the plurality of the drive assist devices upon determining that the update of the middle point is allowed, wherein:

it is determined that the update of the middle point is allowed while respective operations of all of the drive assist devices are stopped;

a certain drive assist device among the plurality of the drive assist devices includes the update information generation device, and when the certain drive assist device receives the notification that permits the process of updating the middle point, the update information generation device in the certain drive assist device generates the update information; and other drive assist devices than the certain drive assist device among the plurality of the drive assist devices do not generate the update information and instead receive the update information from the certain drive assist device, the update information being generated by the update information generation device included in the certain drive assist device.

6. A non-transitory storage medium storing instructions, which when executed by a computer mounted on a vehicle, causes the computer to perform a process, the vehicle including a plurality of drive assist devices configured to implement a plurality of drive assist functions, respectively, and an update information generation device configured to generate update information to be used by at least one of the drive assist devices to update a middle point in steering control performed by the at least one of the drive assist devices, the process comprising:
   determining whether update of the middle point by the at least one of the drive assist devices is allowed; and
   issuing a notification that permits a process of updating the middle point using the update information, to the plurality of the drive assist devices upon determining that the update of the middle point is allowed, wherein:

it is determined that the update of the middle point is allowed while respective operations of all of the drive assist devices are stopped;

a certain drive assist device among the plurality of the drive assist devices includes the update information generation device, and when the certain drive assist device receives the notification that permits the process of updating the middle point, the update information generation device in the certain drive assist device generates the update information; and other drive assist devices than the certain drive assist device among the plurality of the drive assist devices do not generate the update information and instead receive the update information from the certain drive assist device, the update information being generated by the update information generation device included in the certain drive assist device.

* * * * *